(12) United States Patent
Bromley (10) Patent No.: US 7,716,184 B1
(45) Date of Patent: May 11, 2010

(54) SYSTEM AND METHOD FOR PERFORMING SPARSE BACKUPS

(75) Inventor: Graham Bromley, Dublin, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1084 days.

(21) Appl. No.: 10/460,587

(22) Filed: Jun. 12, 2003

(51) Int. Cl.
G06F 17/00 (2006.01)
G06F 12/00 (2006.01)

(52) U.S. Cl. ................. 707/640; 707/822; 707/650
(58) Field of Classification Search ........... 707/204
See application file for complete search history.

(56) References Cited

U.S. PATENT DOCUMENTS

| | | | |
|---|---|---|---|
| 5,758,050 A * | 5/1998 | Brady et al. ............... 714/1 |
| 5,802,599 A * | 9/1998 | Cabrera et al. ............ 711/170 |
| 5,835,954 A * | 11/1998 | Duyanovich et al. ....... 711/162 |
| 5,873,101 A * | 2/1999 | Klein ........................ 707/204 |
| 6,397,308 B1 * | 5/2002 | Ofek et al. ................. 711/162 |
| 6,633,904 B1 * | 10/2003 | Shinkai ..................... 709/213 |
| 6,785,786 B1 * | 8/2004 | Gold et al. ................. 711/162 |
| 6,813,686 B1 * | 11/2004 | Black ........................ 711/114 |
| 6,826,666 B2 * | 11/2004 | Berkowitz et al. ......... 711/162 |
| 6,912,630 B1 * | 6/2005 | Pillai et al. ................. 711/162 |
| 7,047,386 B1 * | 5/2006 | Ngai et al. ................. 711/170 |
| 7,210,021 B2 * | 4/2007 | Sato et al. .................. 711/220 |
| 7,334,007 B2 * | 2/2008 | Cabrera et al. ............ 707/204 |
| 7,415,197 B2 * | 8/2008 | Ando et al. ................ 386/95 |
| 7,533,137 B1 * | 5/2009 | Timpanaro-Perrotta et al. .. 707/205 |
| 7,584,224 B2 * | 9/2009 | Cabrera et al. ............ 707/204 |
| 2002/0107877 A1 * | 8/2002 | Whiting et al. ............ 707/204 |
| 2003/0050974 A1 | 3/2003 | Mani-Meitav et al. ..... 709/203 |
| 2003/0105936 A1 * | 6/2003 | Stakutis et al. ............. 711/202 |
| 2003/0115326 A1 * | 6/2003 | Verma et al. ............... 709/225 |
| 2003/0172226 A1 * | 9/2003 | Jolly ......................... 711/111 |
| 2003/0236956 A1 * | 12/2003 | Grubbs et al. ............. 711/162 |

(Continued)

FOREIGN PATENT DOCUMENTS

WO   WO 2004/047078   * 6/2004

(Continued)

OTHER PUBLICATIONS

U.S. Appl. No. 60/427,880, filed Nov. 2002, Mani-Meitav et al.*

(Continued)

Primary Examiner—Charles Rones
Assistant Examiner—Phuong-Thao Cao
(74) Attorney, Agent, or Firm—Robert C Kowert; Meyertons, Hood, Kivlin, Kowert & Goetzel, P.C.

(57) ABSTRACT

Systems and methods for performing sparse backups are disclosed. One method may involve: receiving information indicating unallocated extents from a file system that organizes data on a primary storage device; copying to a backup storage device data from extents of the primary storage device, where the unallocated extents indicated by the information are not copied; and for each of a plurality of copied extents, storing a mapping from an original extent on the primary storage device to a new extent on the backup storage device into which data stored in that original extent is copied. A backup volume that includes the data included in plurality of copied extents may be mounted, and the mapping may be used to translate accesses to the extents on the backup volume to extents on the backup storage device.

18 Claims, 5 Drawing Sheets

U.S. PATENT DOCUMENTS

| | | | |
|---|---|---|---|
| 2004/0078641 A1* | 4/2004 | Fleischmann | 714/6 |
| 2004/0186968 A1* | 9/2004 | Factor et al. | 711/162 |
| 2004/0199744 A1* | 10/2004 | Bolik et al. | 711/220 |
| 2004/0254907 A1* | 12/2004 | Crow et al. | 707/1 |
| 2005/0216788 A1* | 9/2005 | Mani-Meitav et al. | 714/6 |

OTHER PUBLICATIONS

Norman C. Hutchinson, "Logical vs. Physical File System Backup", The Proceedings of the 3rd Symposium on Operating Systems Design and Implementation, 1999, pp. 1-11.*

Hutchinson, "Logical vs. Physical File System Backup", the Proceedings of the 3rd Symposium on Operating Systems Design and Implementation, 1999, pp. 1-11. (previously provided)\.*

"Windows DDK Glossary," http://msdn.microsoft.com/library/default.asp?url=/library/en-us/gloss/hh/gloss/glossary_628b1dfc-c8f0-4143-a4ef-0dddae24be4b.xml.asp, (3 pages), downloaded May 14, 2003.

"Repliweb R-1 User Guide—Version 3.1," Replieb, Inc., 2002, (27 pages).

"FilesX Xchange RestoreTM For Microsoft Exchange Server," FilesX, Inc., Aug. 2003, (2 pages).

* cited by examiner

SYSTEM AND METHOD FOR PERFORMING SPARSE BACKUPS

BACKGROUND

1. Field of the Invention

This invention relates to file systems and, more particularly, to performing backups.

2. Description of the Related Art

File systems organize and manage information stored in a computer system. Typically, information is stored in the form of files. File systems may support the organization of user data by providing and tracking organizational structures such as folders and directories. The file system may interpret and access information stored in a variety of storage media, abstracting complexities associated with the tasks of locating, retrieving, and writing data to the storage media.

Backups are typically performed by copying individual files from one physical location to another. In order to locate each file being copied, each file is typically accessed through the file system. The file system maintains metadata (e.g., in an Mode table or master file table) that is used to locate the blocks within each file on the primary storage media. Accessing this metadata may itself involve accessing the primary storage media, and thus locating the files on the primary storage media may involve significant amount of I/O. Additionally, if the file system actually accesses a logical volume that is itself mapped to the primary storage media, generating the block location information from the metadata may involve a significant amount of computation, depending on the complexity of the mapping that relates the logical volume to the physical volume. Furthermore, performing backups through the file system may increase the load on the file system, which may in turn decrease file system performance for actual users for the duration of the backup.

In other systems, backups may be performed without accessing each file through the file system by simply copying the entire storage volume managed by the file system. However, this method of performing backups may unnecessarily reduce network performance by copying needless data in situations where a large portion of the storage volume is not currently in use. As these examples show, improved methods of performing backups are desired.

SUMMARY

Various embodiments of systems and methods for performing sparse backups are disclosed. Some embodiments of a method may involve: receiving information indicating unallocated extents from a file system that organizes data on a primary storage device; copying to a backup storage device data from extents of the primary storage device corresponding to the file system, where the unallocated extents indicated by the information are not copied; and for each of a plurality of copied extents, storing a mapping from an original extent on the primary storage device to a new extent on the backup storage device into which data stored in that original extent is copied. A backup volume that manages the copied data stored on the backup storage device may be mounted and the mapping may be used to translate accesses to extents on the backup volume to extents on the backup storage device.

The copied extents may be copied to the backup storage device from a point-in-time snapshot of the primary storage device in some embodiments. The data in the copied extents may be transferred to the backup storage device via a SAN (Storage Area Network. In one embodiment, for each of the plurality of copied extents, this copying may involve generating one or more SCSI (Small Computer Systems Interface) commands specifying a length of at least a portion of that copied extent and an original starting address of the portion of that copied extent on the primary storage device and a new starting address on the backup storage device.

In some embodiments, the information indicating the unallocated extents may identify unallocated extents of a logical volume having a configuration different from the physical configuration of the primary storage device. Volume configuration information indicating how extents of the logical volume map to physical extents of the primary storage device may be used to identify the unallocated physical extents. This volume configuration may be stored along with the information mapping extents on the primary storage device to extents on the backup storage device and used to translate accesses generated by the backup file system.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
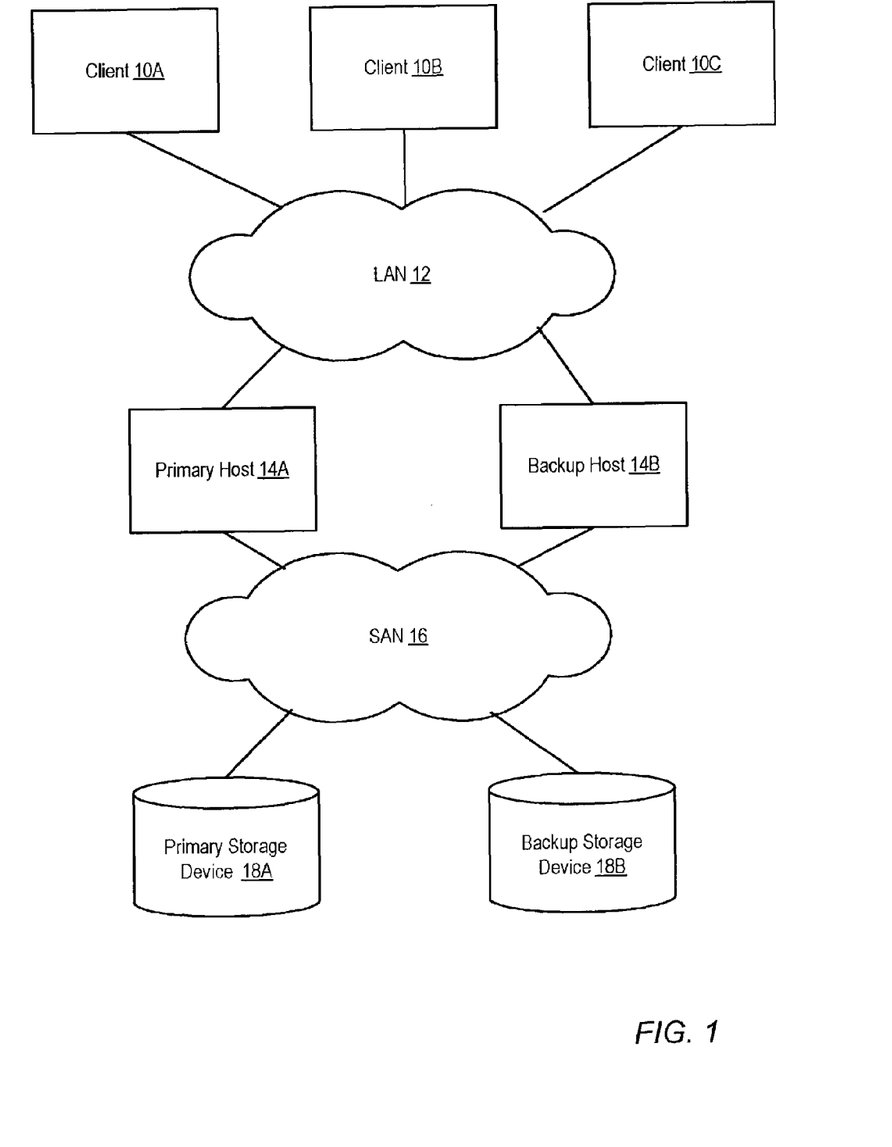
FIG. 1 illustrates a system configured to implement sparse file system backups, according to one embodiment.

FIG. 1 illustrates an exemplary system that may implement sparse backups. As shown, such a system may include several storage devices 18A-18B, a SAN (Storage Area Network) 16, several hosts (which may also be referred to as servers) 14A-14B, a LAN (Local Area Network) 12, and/or several client devices 10A-10B. Note that other embodiments may include fewer or additional components. Throughout this disclosure, drawing elements identified by the same numeral followed by a unique alphabetic identifier (e.g., storage devices 18A and 18B) may be collectively referred to by that numeral alone (e.g., storage devices 18).

Storage devices 18A-18B may be implemented using various storage media. Each storage device 18 may be a mass storage device, such as a hard disk, Flash memory device, CD-ROM (Compact Disc Read Only Memory), or DVD (Digital Versatile Disc) ROM. A storage device 18 may also include a combination of several such devices. For example, in some embodiments, a storage device 18 may include one or more arrays of such storage devices. In one embodiment, each storage device 18 may include a RAID (Redundant Array of Independent Disks) subsystem.

Hosts 14 may be implemented from any of various types of computing devices. As used herein, the term "host" refers to any computing device that includes a memory and at least one processor configured to execute instructions stored in the memory, or to any integrated circuit (e.g., an FPGA (Field Programmable Gate Array) or ASIC (Application Specific Integrated Circuit)) configured to perform the functions specified by such instructions, or any mechanical device configured to perform such functions. Each host 14 may execute program instructions or be configured to implement a file system that manages files stored on one of the storage devices 18 as well as to implement all or part of a sparse backup operation, as described below. Clients 10 may access those files by communicating with the appropriate host 14.

In the illustrated embodiment, the hosts 14 are coupled to each other and to clients 10 by a LAN 12. The hosts 14 are also each coupled to the storage devices 18 by a SAN 16. Note that in other embodiments, storage devices 18 may be NAS (Network Attached Storage) devices coupled to the hosts 14 by LAN 12. Additionally, in other embodiments, hosts 14 may be coupled to each other and/or to clients 10 by a WAN (Wide Area Network).

In some embodiments, space on each storage device 18 (or space included in a logical volume implemented over each storage device) may be allocated in logical blocks. For example, multiple 512-byte sectors may be combined to form logical blocks. In one embodiment, a file system may support logical block sizes of 1024, 2048, 4096, and/or 8192 bytes. One or more adjacent logical blocks may be grouped into an extent. An extent is a group of one or more adjacent logical blocks specified by an address-length pair, which identifies the starting block address and the length of the extent in logical blocks. The file system may allocate storage in multi-block extents or groups of extents rather than a block at a time. Extents may allow storage device I/O to take place in units of multiple blocks if storage is allocated in consecutive blocks. For sequential I/O, multiple-block operations may take less time to perform than block-at-a-time operations. Note that in some embodiments, extents may have a constant length (e.g., one block). In such embodiments, the length for each extent may be implicit (e.g., the length for each extent may not be specified in extent information maintained for each file).

Figure 2:
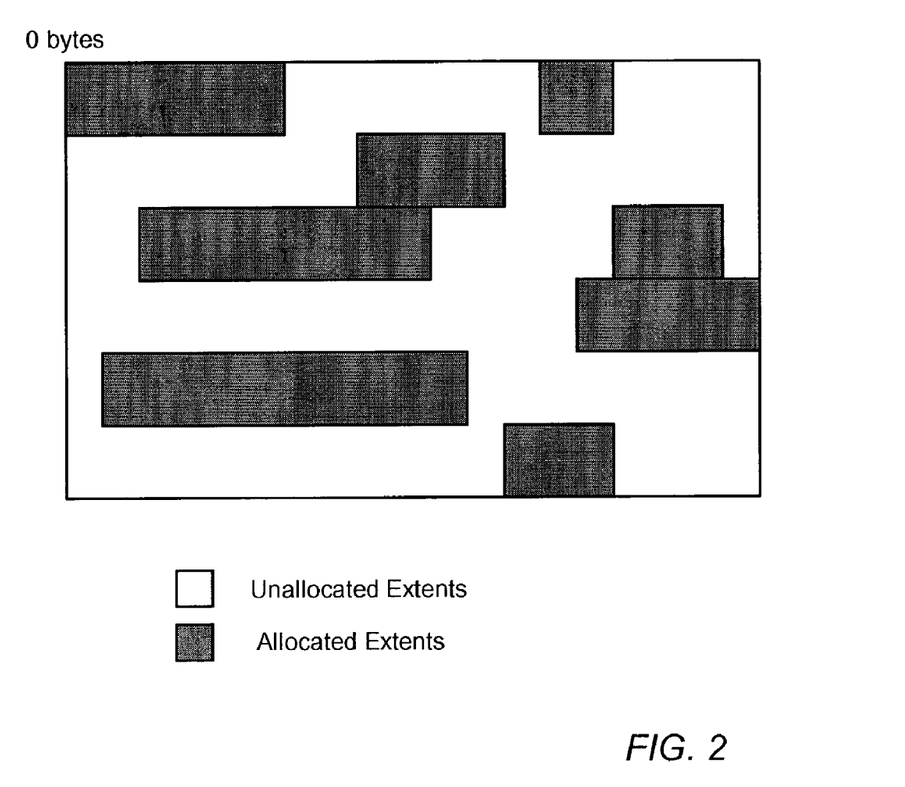
FIG. 2 illustrates how extents of data may be allocated on a primary storage device, according to one embodiment.

FIG. 2 illustrates how the storage available on a storage device 18 or logical storage volume may include both allocated and unallocated extents. FIG. 2 is a logical representation of a storage device 18 that includes N bytes of storage. Bytes that are included in allocated extents are shaded, while unallocated extents are not. As shown, the allocated portions of the storage device 18 may not be logically or physically contiguous. Additionally, the allocated extents may each include portions of different files. Furthermore, portions of an individual file may be distributed among several different allocated extents. A file system may use metadata (e.g., in an inode table or master file table), which may itself be part of the data stored in the allocated extents, to track where each portion of each file is stored. Other file system metadata (e.g., a free list), which again may be stored as part of the data in the allocated extents, may track unallocated extents in a particular storage device 18.

Figure 3:
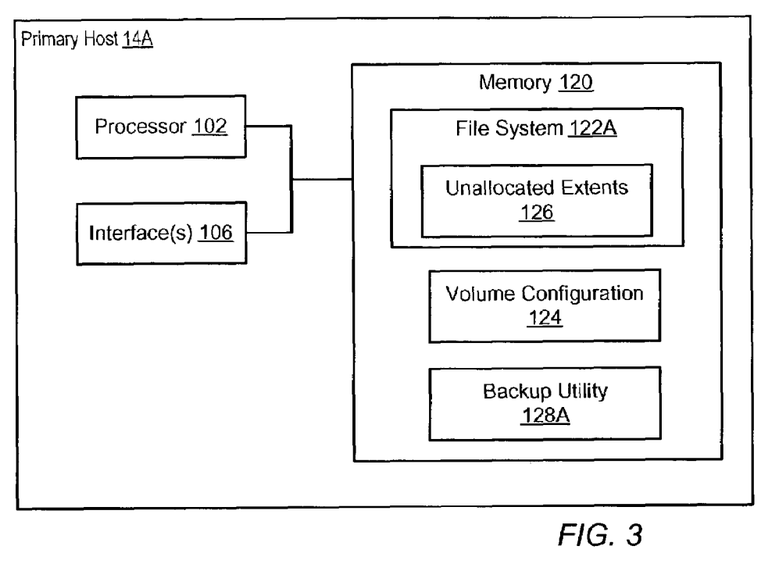
FIG. 3 illustrates a host system that includes a file system configured to maintain volume configuration information and information identifying unallocated extents for a primary storage device, according to another embodiment.

FIG. 3 shows a block diagram of a primary host 14A that includes one or more processors 102, a memory 120, and one or more interfaces 106 (e.g., to SAN 16 and/or to LAN 12 of FIG. 1). In the illustrated embodiment, instructions and data implementing a file system 122 are stored in memory 120 and executed by one or more processors 102. Memory 120 may also store program instructions executable by processor(s) 102 to implement a backup utility 128A that performs all or part of a sparse backup. Note that in another embodiment, host 14A may include an FPGA or other hardware configured to implement all or part of the operations performed by a file system 122 and/or backup utility 128A.

File system 122 manages data stored within storage device 18A. Exemplary types of files that may be managed by file system 122 include regular files (e.g., text or binary data files), directory files (files which include other files and/or directories), executable files, symbolic links (files which point to other files), device special files (files which provide an interface to hardware), sockets (files which provide an interface to a network program), and named pipes (files which provide access to other programs). Note that in some embodiments, only a portion the data stored by storage device 18A may be managed by file system 122 (e.g., file system 122 may manage data stored in one of several logical volumes implemented over storage device 18A).

The file system 122 may also access metadata stored on primary storage device 18A and cache recently accessed metadata in memory 120. Some file system metadata 126 indicates which extents of the storage device 18A are currently not allocated to files and/or metadata in the file system. This metadata 126 may be updated by the file system 122 each time the file system allocates or deallocates an extent to a file or other metadata. The file system 122 may use this information 126, which may be referred to as a free list, when selecting extents to allocate for the storage of new files or metadata. In many embodiments, the file system metadata 126 may indicate the unallocated extents of the storage device 18A by identifying which logical extents of a logical volume implemented over storage device 18A are currently unallocated.

In some embodiments, file system 122 may be part of a distributed file system used to organize data accessed by various components of a networked computer system. In such embodiments, file system 122 may be executed on one system (e.g., a file server) and accessed by other systems (e.g., user workstations coupled to the file server by a local area network). In other embodiments, file system 122 may be implemented and used within a single host 14A. In still other embodiments, file system 122 may be implemented as a clustered file system.

Volume configuration information 124 may indicate the volume configuration of a logical volume implemented over storage device 18A. This information may be maintained by a volume manager or device driver. Volume configuration information 124 defines a geometric relationship between an extent of the logical volume and one or more extents in the physical storage device that make up that logical volume. For example, if the logical volume is implemented over a storage device that includes an array of disk drives, the volume configuration information may map each logical extent to one or more extents of the various disk drives. The volume configuration information 124 allows accesses targeting an extent of the logical volume to be translated to accesses targeting an extent of the physical storage device using a relatively simple calculation. Note that in some embodiments, there may be several levels of logical volumes (e.g., each managed by a different volume manager or device driver) between the file system and the actual physical storage device 18A. In such embodiments, a different set of volume configuration information 124 may indicate the relationship between each successive pair of logical volumes.

The primary host 14A may be configured to create a point-in-time snapshot of the data on the primary storage device 18A to be used when backing up the primary storage device. This point-in-time snapshot may be created using various snapshot techniques such as those involving a synchronized mirror volume or copy-on-write snapshots. In other embodiments, the backup may be created directly from the primary storage device 18A without the use of a point-in-time snapshot. For example, in some embodiments, write access to the storage device 18A may be blocked while a backup copies data directly from the primary storage device 18A.

Figure 4:
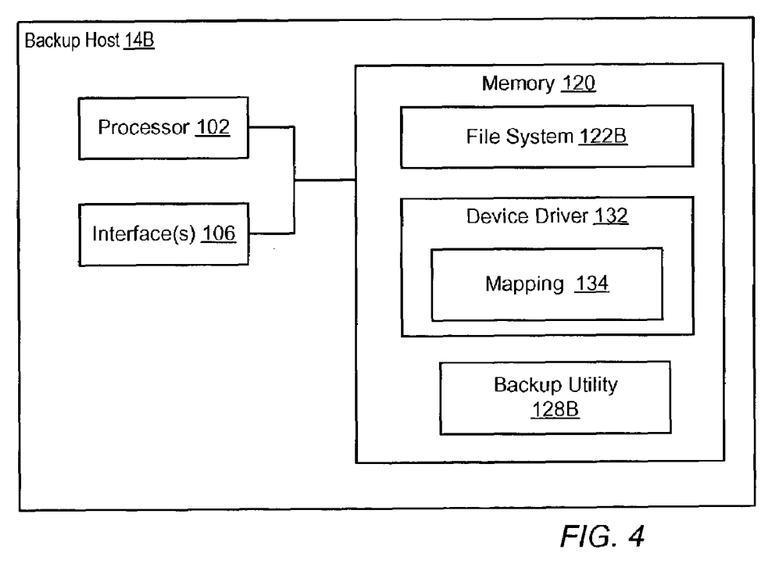
FIG. 4 illustrates a backup system that includes a backup file system and a device driver configured to map accesses generated by the backup file system from extents on the primary storage device to extents on the backup storage device, according to one embodiment.

FIG. 4 shows a block diagram of a backup host 14B that includes one or more processors 102, a memory 120, and one or more interfaces 106 (e.g., to SAN 16 and/or to LAN 12 of FIG. 1). In some embodiments, backup host 14B may be implemented in the same physical computer system as primary host 14A. In still other embodiments, the same host may perform functions of both primary host 14A and backup host 14B.

In the illustrated embodiment, instructions and data implementing a file system 122 are stored in memory 120 and executed by one or more processors 102. The file system implemented on the backup host may be the same type (e.g., the same version and manufacturer) of file system as the file system implemented on the primary host. File system 122B manages data stored within storage device 18B. Instructions and data implementing a backup utility 128B configured to perform all or part of a sparse backup operation may also be stored in memory 120.

Program instructions implementing a device driver 132 may also be stored in memory 120 of backup host 14B (and/or host 14B may include hardware configured to perform all or some of the functions of device driver 132). This device driver 132 may be configured to translate accesses targeting backup storage device 18B into the backup storage device's command language. Device driver 132 may also be configured to maintain a mapping 134 indicating where extents copied from the primary storage device 18A are stored on backup storage device 18B. Device driver 132 may use this mapping 134 to translate accesses targeting extents on the primary storage device (or the primary logical storage volume) to accesses targeting extents backup storage device 18B.

To initiate a sparse backup of data from primary storage device 18A to secondary storage device 18B, primary host 14A may operate (e.g., by executing program instructions 128A) to extract information 124 indicative of the volume configuration of a logical volume (if any) implemented over primary storage device 18A and information 126 indicative of which extents of the primary storage device are not currently allocated. The volume configuration information 124 may be used to identify the physical extents of physical storage device 18A corresponding to each unallocated logical extent identified in the information 126. The information 126 indicative of the unallocated extents and/or volume configuration 124 may be extracted from a point-in-time snapshot of the data on the primary storage device 18A instead of actually being extracted from storage device 18A in some embodiments.

Once the information 126 and/or 124 is extracted, the volume configuration information 124 and/or unallocated extent information 126 may be used to identify which extents of the primary storage device 18A that correspond to the file system 122 (e.g., which extents are included in a logical volume accessed by the file system) are allocated. All of the data on storage device 18A that corresponds the file system 122, except that identified in the unallocated extent information 126, may be copied over to the backup storage device 18B (e.g., from a point-in-time snapshot of storage device 18A). The data may be copied without regard to which portions of the data correspond to any particular file. In other words, the host initiating the copy operations to copy data to the backup storage device 18B may not need to identify which portions of the data correspond to any particular file in order to initiate or perform the copy operations. This provides a "sparse" backup in the sense that not all of the data stored on the primary storage device is copied (i.e., only allocated extents not identified in metadata 126 are copied). Note that the copied extents may be stored in different physical locations of the backup storage device 18B than they are stored on the primary storage device 18A. Note also that the backup storage device 18B may have significantly less physical storage than primary storage device 18A (e.g., if a large portion of primary storage device 18A is not allocated), while still being able to store all of the allocated extents being copied from storage device 18A.

The data movement needed to copy the allocated extents (i.e., all extents except those indicated as being unallocated by the file system metadata 126) may take place over a SAN linking the primary and backup storage devices in some embodiments. For example, one or more SCSI (Small Computer Systems Interface) block commands may be used to initiate each extent copy operation needed to copy all of the allocated extents. Each SCSI command may specify a length of a copied extent, an original starting address of that copied extent on the primary storage device, and a new starting address on the backup storage device. In alternative embodiments, the data movement may take place over a LAN.

Figure 4A:
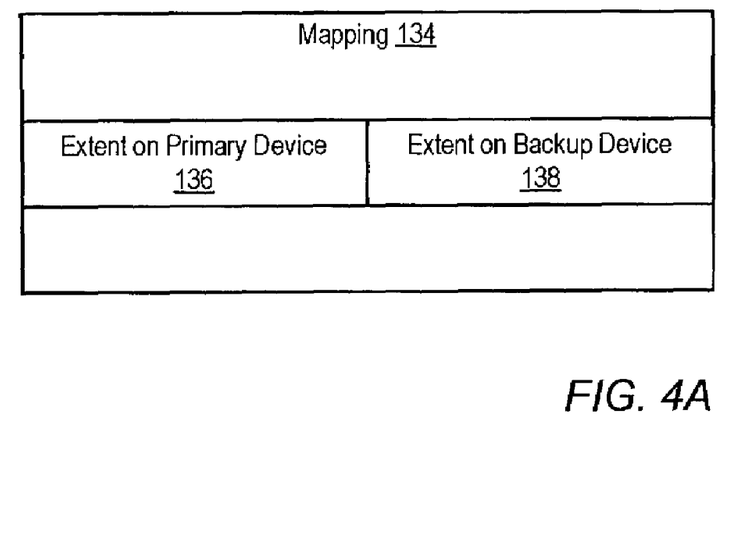
FIG. 4A illustrates how mapping information may track the relationship between an extent on a primary storage device and an extent on a backup storage device, according to one embodiment.

As the allocated extents on primary storage device 18A are copied over to backup storage device 18B, the backup utility 128B on backup host 14B (or backup utility 128A on primary host 14A if the primary host is performing this portion of the sparse backup operation) may store information 134 that maps each copied extent on primary storage device 18A to an extent on backup storage device 18B. In one embodiment, this information 134 may include a table that correlates information 136 identifying an extent copied from the primary device to information 138 identifying an extent on the backup device, as shown in FIG. 4A. This information 134 may be stored by and/or provided to backup host 18B. This mapping 134 may neither depend on nor identify any correspondence between individual files and copied extents. The mapping 134 may also include volume configuration information 124 indicating the volume configuration of a logical volume implemented over storage device 18A.

In some embodiments, a backup utility 128A on the host 14A may perform all of the operations (e.g., generating commands to copy data to storage device 18B, storing mapping information relating extents on primary storage device 18A to extents on backup storage device 18B) needed to complete the sparse backup operation. In other embodiments, the host 14A may provide the extracted information 124 and/or 126 to the backup host 14B so that the backup utility 128B on backup host 14B may complete the sparse backup operation, thus offloading work from the primary host 14A. For example, the host 14A may provide the extracted information identifying the unallocated extents and/or the volume configuration to the backup host 14B via a LAN connecting the hosts (if the two hosts are not implemented in the same machine). Alternatively, the host 14A may provide the backup host 14B with information identifying the address(es) of this data (e.g., via a LAN) and the backup host may responsively copy the data from the identified address(es) (e.g., via a SAN).

When the backup file system on backup storage device 18B is mounted, file system software 122B operating on backup host 18B may access files and file system metadata in a backup storage volume that has the same volume configuration as a primary storage volume (e.g., the storage device 18A or a logical volume implemented over that device) accessed by file system 122A. The device driver 132 may implement this logical backup volume over backup storage device 134 such that, from the perspective of file system 122B, the backup volume has the same volume configuration as primary storage device 18A. The device driver 132 may use the mapping 134 to translate accesses generated by file system 122B (or any other application) to the logical backup volume into accesses to the actual physical storage device 18B. For example, when the file system 122B requests a particular extent of the logical volume, that extent may be translated into a physical extent of the primary storage device 18A using the volume configuration information 124. The device driver 132 may then use the mapping 134 to translate that physical extent to a physical extent on backup storage device 18B. Since extents that were not allocated on the primary storage device at the time of the backup are not copied to the backup storage device 18B, the device driver 132 may return an error indication in response to an access that targets one of the unallocated extents.

File system 122B may be configured to locate at least some file system metadata at the same extent (e.g., block 2 of the logical volume) of the logical backup volume as file system 122A locates that metadata on a primary storage volume. When file system 122B access this metadata (through device driver 132, which uses the logical extent to access the appropriate physical extent on storage device 18B), file system 122B may use this metadata to correctly locate all of the other file system metadata included in the allocated extents copied from primary storage device 18A, which may in turn indicate the locations of each of the data files included in the copied extents. Thus, performing a sparse backup may (at least in some embodiments) copy all of the information needed to mount the copied data as a backup volume without copying unallocated data from the primary volume and without having to perform computation- and/or file-system-intensive file-to-extent translations during the sparse backup. The metadata included in the allocated extents copied to storage device 18B includes the metadata 126 indicating which extents are not allocated, and thus if the backup volume is mounted as a read-only volume, the file system 122B will not attempt to access the unallocated extents.

Figure 5:
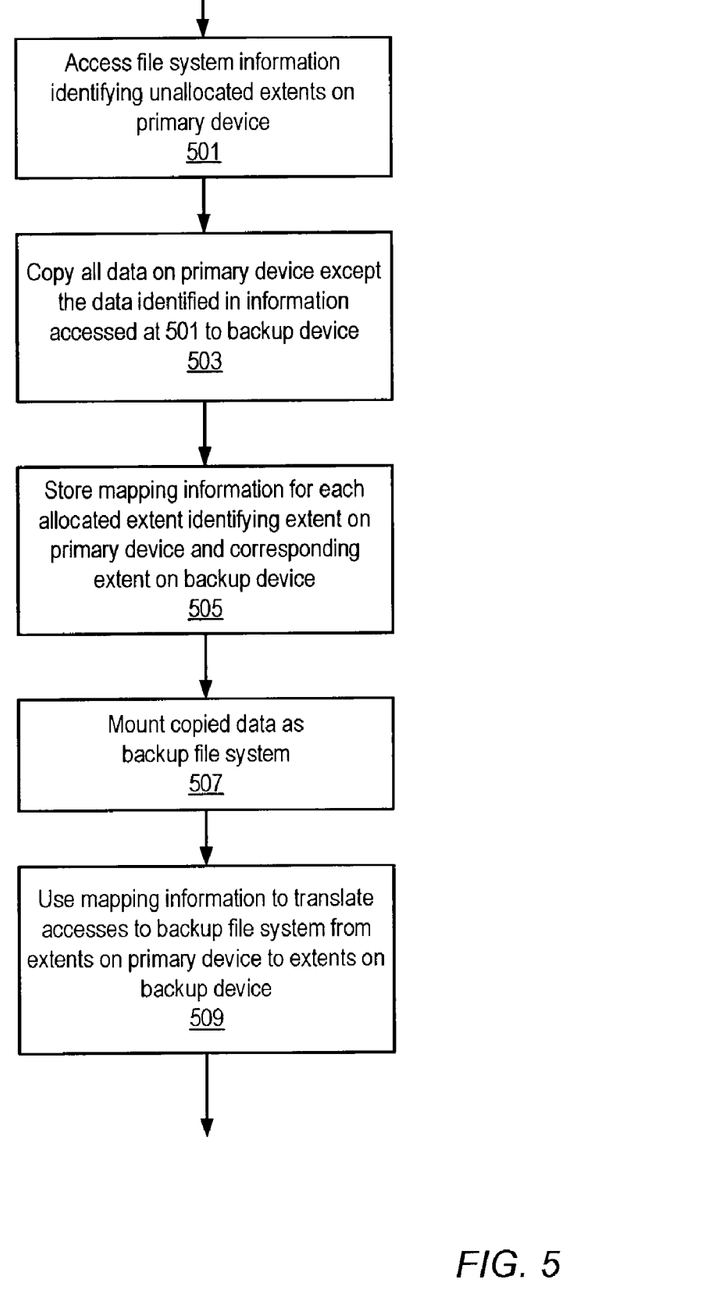
FIG. 5 is a flowchart of one embodiment of a method of performing sparse backups.

FIG. 5 is a flowchart of one embodiment of a method of performing a sparse backup operation of a primary storage device and accessing the data copied by the sparse backup through a backup file system. In some embodiments, the method of FIG. 5 may be performed by backup utilities 128A and/or 128B shown in FIGS. 3-4. At 501, file system information (e.g., a free list) indicative of unallocated extents on the primary storage device is accessed. This information may be accessed directly from a primary storage device that stores metadata included in the file system or, alternatively, this information may be indirectly accessed from a point-in-time snapshot of the primary storage device. In embodiments in which a logical volume is superimposed over the primary storage device, this information may indicate which extents of the logical volume are unallocated. Additional configuration information that maps extents of the logical volume to extents of the primary storage device may be used in conjunction with the information accessed at 501 to identify which extents of the primary storage device are unallocated.

As indicated at 503, all of the extents on the primary storage volume except those extents indicated by the information accessed at 501 may be copied to a backup storage device. In some embodiments, this copying may take place indirectly by copying the primary storage device's data from a point-in-time snapshot of the primary storage device. In other embodiments, this copying may take place by directly copying the data from the primary storage device. In such embodiments, write access to all or part of the primary storage device may be blocked while the copying is taking place. Copying of the allocated extents may take place via a SAN in some embodiments.

Mapping information for each allocated extent may be stored, as indicated at 505. This mapping information may relate each copied extent of the primary storage device to an extent on the backup storage device into which the primary storage device extent is copied. This mapping information may also include volume configuration information relating a logical volume implemented over the primary storage device to physical extents of the primary storage device.

In some embodiments, a primary host on which the file system is executing may perform functions 501-505. In other embodiments, a primary host may provide the information accessed at 501 to a backup host. In response, the backup host may perform functions 503 and 505. Other embodiments may distribute all or part of functions 501-507 among multiple hosts in other ways.

At 507 and 509, the copied data may be mounted as a backup volume, and the copied data may be accessed on the backup storage device using the mapping information stored at 505. The backup volume may be mounted as a read-only volume in many embodiments. Software instructions included in a backup file system may access files and metadata included in the backup volume using the same volume representation as is used by the primary file system, and accesses targeting this logical backup volume may be translated into access targeting the appropriate extents of the backup device using the mapping information stored at 505.

Returning to FIGS. 1, 3 and 4, note that each host computer system 14 and client 10 may take various forms, including a workstation, server, mainframe computer system, network appliance, network computer, Internet appliance, personal digital assistant (PDA), embedded device, smart phone, television system, another suitable device, or combinations thereof.

Additionally, note that all or part of a file system application 122 and program instructions implementing all or part of a backup utility 128 may be stored on various computer accessible media such as memory 120. Examples of computer accessible storage media include hard disk storage, floppy disk storage, removable disk storage, flash memory, MEMS (Micro Electro Mechanical Systems) memory, punch cards, magnetic core, and random access memory (RAM). Computer accessible storage media may include an installation medium, e.g., a CD-ROM or floppy disk. In addition, a computer accessible medium may be included in one computer system that provides the program instructions over a network to another computer system for execution. Thus, various embodiments may further include receiving, sending or storing instructions and/or data implemented in accordance with the foregoing description upon a computer accessible medium. A computer accessible medium may include a communication medium such as network and/or a wireless link on which communication signals such as electrical, electromagnetic, optical, or digital signals are conveyed.

The flow charts described herein represent exemplary embodiments of methods. The methods may be implemented in software, hardware, or a combination thereof. The order of the method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
    a backup host receiving information indicating unallocated extents from a file system of a primary host that organizes data on a primary storage device, wherein each unallocated extent is an extent that is not currently allocated to a file or to metadata by the file system for storage of the file or the metadata;
    the backup host copying to a backup storage device data from extents of the primary storage device that correspond to the file system, wherein data from the unallocated extents indicated by the information is not copied;
    for each of a plurality of copied extents, the backup host storing a mapping identifying an original extent on the primary storage device and identifying a new extent on the backup storage device into which data stored in that original extent is copied; and
    the backup host using the mapping to translate accesses to extents on a backup volume that includes the data included in the plurality of copied extents to extents on the backup storage device;
    wherein each extent comprises a plurality of adjacent logical blocks specified by an address-length pair.

2. The method of claim 1, further comprising:
    mounting the backup volume as a read-only backup volume.

3. The method of claim 2, further comprising the backup host generating an error indication in response to an attempt to access one of the unallocated extents not copied by said copying.

4. The method of claim 1, wherein said copying comprises generating one or more SCSI (Small Computer Systems Interface) commands specifying a length of at least a portion of that copied extent, an original starting address of the at least a portion of that copied extent on the primary storage device, and a new starting address on the backup storage device for each of the plurality of copied extents.

5. The method of claim 1, wherein said copying comprises transferring data included in the plurality of copied extents to the backup storage device via a Storage Area Network (SAN).

6. The method of claim 1, wherein the information identifies unallocated extents of a logical volume, wherein the method further comprises mapping the unallocated extents from the logical volume to the primary storage device; wherein said storing the mapping comprises storing information indicative of a mapping of the logical volume to the primary storage device.

7. The method of claim 1, further comprising:
    the primary host on which the file system is executing providing to the backup host the information and configuration information indicating a configuration of a logical primary volume relative to a configuration of the primary storage device; and
    the backup host mapping extents of the logical primary volume not identified by the information to extents of the primary storage device in response to the configuration information.

8. The method of claim 7, wherein said providing comprises the primary host sending the information and the configuration information to the backup host via a Local Area Network (LAN).

9. The method of claim 7, wherein said providing comprises:
    the primary host storing the information and the configuration information to a storage device and sending an indication of said storing to the backup device; and
    in response to the indication, the backup host reading the information and the configuration information from the storage device.

10. The method of claim 1, wherein the primary storage device is an array of disk drives.

11. The method of claim 1, wherein said copying comprises copying from a point-in-time snapshot of the primary storage device the data in extents on the primary storage device corresponding to the file system, wherein the unallocated extents indicated by the information are not copied.

12. A tangible, computer accessible storage medium, comprising program instructions executable to implement:
    a backup host receiving information indicating unallocated extents from a file system of a primary host that organizes data on a primary storage device, wherein each unallocated extent is an extent that is not currently allocated to a file or to metadata by the file system for storage of the file or the metadata;
    the backup host copying to a backup storage device data from extents of the primary storage device corresponding to the file system, wherein data from the unallocated extents indicated by the information is not copied;
    for each of a plurality of copied extents, the backup host storing a mapping identifying an original extent on the primary storage device and identifying a new extent on the backup storage device into which data stored in that original extent is copied; and
    the backup host using the mapping to translate accesses to extents on a backup volume to extents on the backup storage device, wherein the backup volume includes the plurality of copied extents stored on the backup storage device;
    wherein each extent comprises a plurality of adjacent logical blocks specified by an address-length pair.

13. The tangible, computer accessible storage medium of claim 12, wherein the program instructions are executable to copy the data by generating one or more SCSI (Small Computer Systems Interface) commands specifying a length of at least a portion of that copied extent, an original starting address of the at least the portion of that copied extent on the primary storage device, and a new starting address on the backup storage device for each of the plurality of copied extents.

14. The tangible, computer accessible storage medium of claim 12, wherein the program instructions are executable to copy the data by transferring data included in the plurality of copied extents to the backup storage device via a Storage Area Network (SAN).

15. The tangible, computer accessible storage medium of claim 12, wherein the information identifies unallocated extents of a logical volume, wherein the program instructions are executable to map the unallocated extents from the logical volume to the primary storage device, and wherein the mapping comprises information indicative of a mapping of the logical volume to the primary storage device.

16. The tangible, computer accessible storage medium of claim 12, wherein the program instructions are executable to copy the data to the backup storage device by copying from a point-in-time snapshot of the primary storage device the data in all extents on the primary storage device except the unallocated extents indicated by the information.

17. A system, comprising:
   a processor; and
   a memory coupled to the processor and configured to store program instructions executable by the processor to implement:
      a backup host receiving information indicating unallocated extents from a file system of a primary host that organizes data on a primary storage device, wherein each unallocated extent is an extent that is not currently allocated to a file or to metadata by the file system for storage of the file or the metadata;
      the backup host copying to a backup storage device data from extents of the primary storage device corresponding to the file system, wherein data from the unallocated extents indicated by the information is not copied;
      for each of a plurality of copied extents, the backup host storing a mapping identifying an original extent on the primary storage device and identifying a new extent on the backup storage device into which data stored in that original extent is copied; and
      the backup host using the mapping to translate accesses to extents on a backup volume that includes the data included in the plurality of copied extents to extents on the backup storage device;
   wherein each extent comprises a plurality of adjacent logical blocks specified by an address-length pair.

18. A system, comprising:
   a primary storage device configured to store an organization of data;
   a backup storage device coupled to the primary storage device;
   a primary host coupled to the primary storage device and configured to maintain information indicating unallocated extents of the organization of data on the primary storage device, wherein each unallocated extent is an extent that is not currently allocated to a file or to metadata for storage of the file or the metadata;
   a backup host configured to:
      receive the information from the primary host;
      copy to the backup storage device data from extents of the primary storage device corresponding to the organization of data, wherein the backup host is configured to not copy data from the unallocated extents indicated by the information;
      store mapping information identifying each copied extent on the primary storage device and identifying an extent on the backup storage device into which data stored in that copied extent is copied; and
      use the mapping to translate accesses to extents on a backup volume that includes the data included in the copied extents to extents on the backup storage device;
   wherein each extent comprises a plurality of adjacent logical blocks specified by an address-length pair.

* * * * *